US012496841B2

(12) United States Patent
Okeguchi

(10) Patent No.: US 12,496,841 B2
(45) Date of Patent: Dec. 16, 2025

(54) LIQUID DISCHARGE APPARATUS

(71) Applicant: Muneyuki Okeguchi, Kanagawa (JP)

(72) Inventor: Muneyuki Okeguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 175 days.

(21) Appl. No.: 18/372,704

(22) Filed: Sep. 26, 2023

(65) Prior Publication Data

US 2024/0100869 A1 Mar. 28, 2024

(30) Foreign Application Priority Data

Sep. 28, 2022 (JP) ................................ 2022-155237

(51) Int. Cl.

| | |
|---|---|
| ***B41J 29/377*** | (2006.01) |
| ***B41J 2/21*** | (2006.01) |
| ***B41J 29/13*** | (2006.01) |
| ***B41J 29/17*** | (2006.01) |

(52) U.S. Cl.

CPC ........... *B41J 29/377* (2013.01); *B41J 2/2114* (2013.01); *B41J 2/2117* (2013.01); *B41J 29/13* (2013.01); *B41J 29/17* (2013.01)

(58) Field of Classification Search

CPC ...... B41J 29/377; B41J 2/2114; B41J 2/2117; B41J 29/13; B41J 29/17

See application file for complete search history.

(56) References Cited

U.S. PATENT DOCUMENTS

| | | | | |
|---|---|---|---|---|
| 2014/0292920 | A1* | 10/2014 | Shibata | B41J 2/1714 347/34 |
| 2017/0313109 | A1* | 11/2017 | Profaca | B41J 25/006 |
| 2018/0361761 | A1 | 12/2018 | Okeguchi et al. | |
| 2019/0047306 | A1* | 2/2019 | Sasaki | B41J 29/377 |
| 2020/0094582 | A1 | 3/2020 | Okeguchi et al. | |
| 2021/0039411 | A1* | 2/2021 | Aono | B41J 11/007 |
| 2021/0229472 | A1 | 7/2021 | Morino et al. | |
| 2021/0291526 | A1 | 9/2021 | Okeguchi | |
| 2022/0063278 | A1 | 3/2022 | Okeguchi | |

FOREIGN PATENT DOCUMENTS

| | | |
|---|---|---|
| JP | 2010-179596 A | 8/2010 |
| JP | 2019-131909 A | 8/2019 |

* cited by examiner

*Primary Examiner* — Justin Seo

(74) *Attorney, Agent, or Firm* — XSENSUS LLP

(57) ABSTRACT

A liquid discharge apparatus includes an apparatus body, a liquid discharge unit, a first ventilation channel a cover, and a second ventilation channel. The liquid discharge unit discharges a liquid. The first ventilation channel in the apparatus body has a first end opened to an interior of the apparatus body in a first direction. The cover is movable between an open position and a closed position to operably close the apparatus body. The second ventilation channel connected to the cover has a second end opened to the interior of the apparatus body in a second direction different from the first direction. The cover at the closed position causes the first end of the first ventilation channel to be connected to the second end of the second ventilation channel.

6 Claims, 6 Drawing Sheets

LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-155237, filed on Sep. 28, 2022, in the Japan Patent Office, the entire disclosure of which is hereby incorporated by reference herein.

BACKGROUND

Technical Field

Embodiments of the present disclosure relate to a liquid discharge apparatus.

Related Art

In the related art, a liquid discharge apparatus discharges a liquid onto a cloth as a recording medium. For example, in the liquid discharge apparatus, the cloth is placed on a stage, the stage is moved to a position facing a liquid discharge unit inside the liquid discharge apparatus, and ink as a liquid is discharged from nozzles of a liquid discharge head of the liquid discharge unit to form an image on the cloth.

Such a liquid discharge apparatus may include an opening-and-closing cover that reciprocates between a position to cover the liquid discharge unit and a position to expose the liquid discharge unit to the outside. When the liquid discharge unit is exposed to the outside, an operator can clean a maintenance unit or a nozzle face of the liquid discharge head, or can replace a carriage, for example. During a liquid discharge operation, the opening-and-closing cover is closed to block the operator from touching a drive unit such as the carriage from the outside. In addition, mist of the ink generated from the liquid discharge unit can be circulated in the liquid discharge unit in a closed space covered by the opening-and-closing cover to collect the mist of the ink.

SUMMARY

Embodiments of the present disclosure describe an improved liquid discharge apparatus that includes an apparatus body, a liquid discharge unit, a first ventilation channel, a cover, and a second ventilation channel. The liquid discharge unit discharges a liquid. The first ventilation channel in the apparatus body has a first end opened to an interior of the apparatus body in a first direction. The cover is movable between an open position and a closed position to operably close the apparatus body. The second ventilation channel connected to the cover has a second end opened to the interior of the apparatus body in a second direction different from the first direction. The cover at the closed position causes the first end of the first ventilation channel to be connected to the second end of the second ventilation channel.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
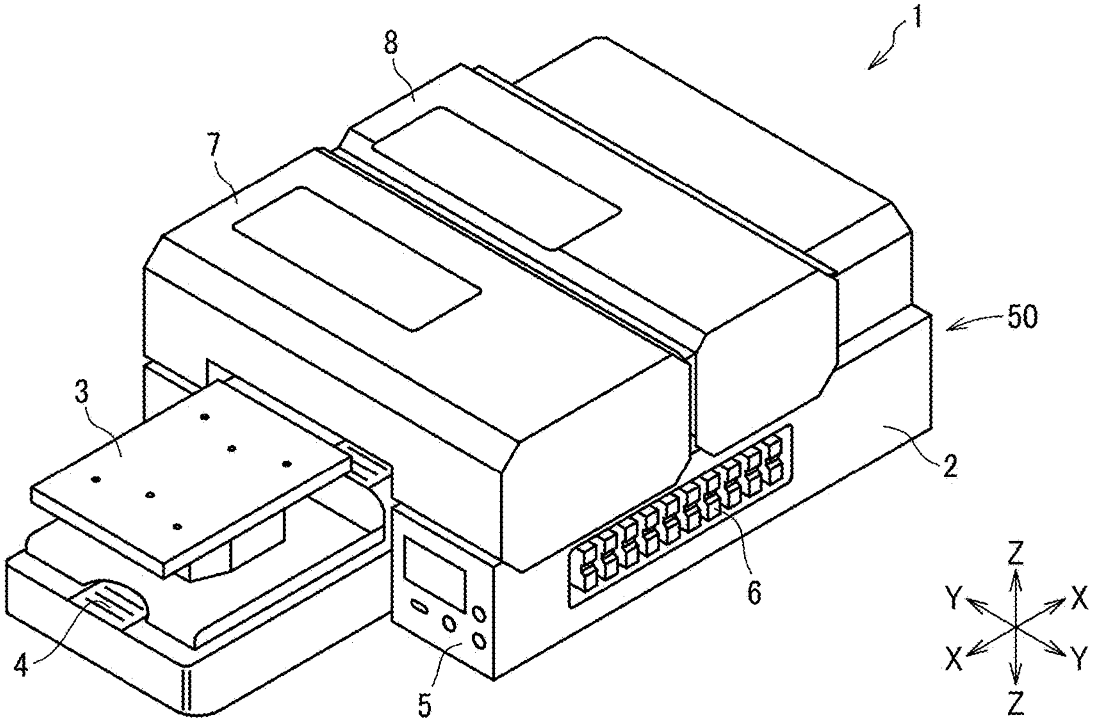
FIG. 1 is a perspective view of a liquid discharge apparatus according to an embodiment of the present disclosure, with covers closed.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate.

Figure 2:
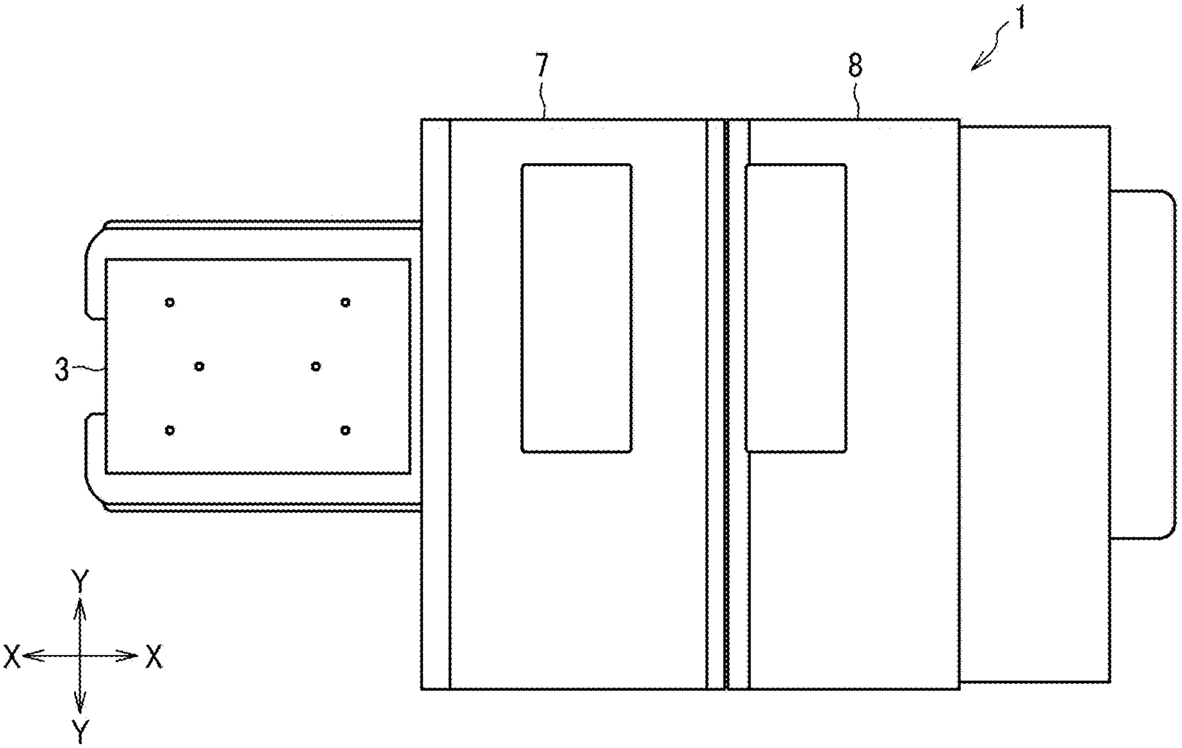
FIG. 2 is a plan view of the liquid discharge apparatus illustrated in FIG. 1.
Figure 3:
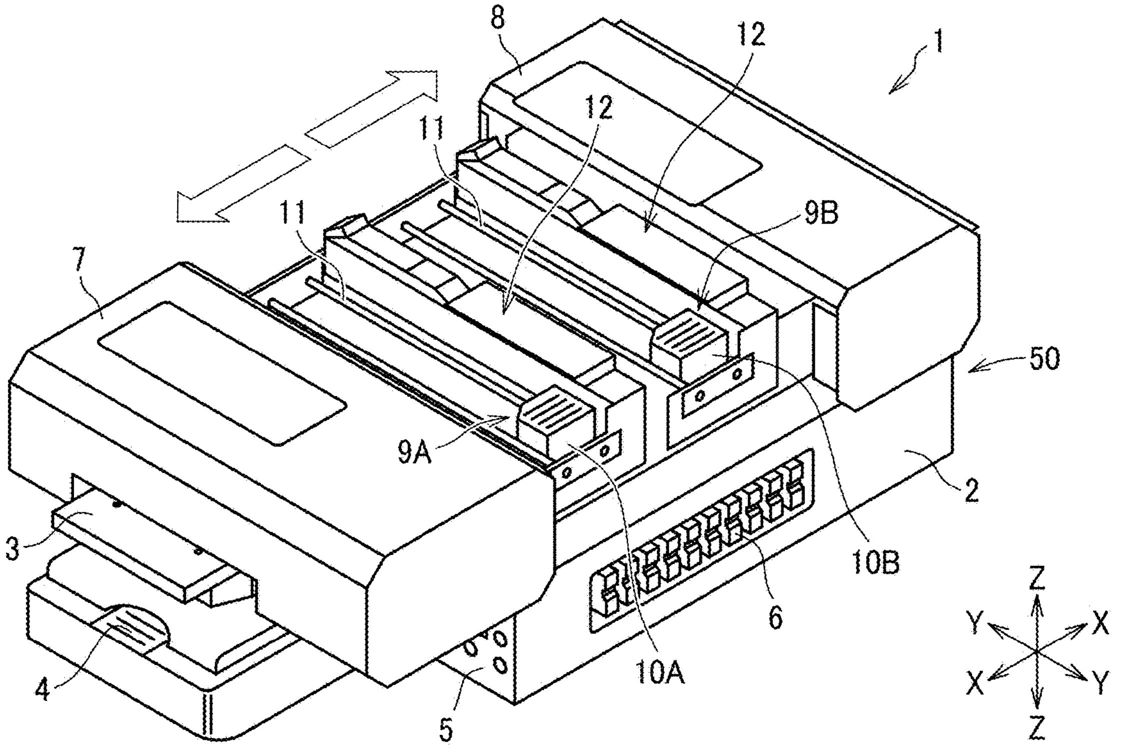
FIG. 3 is a perspective view of the liquid discharge apparatus of FIG. 1 with the covers open.
Figure 4:
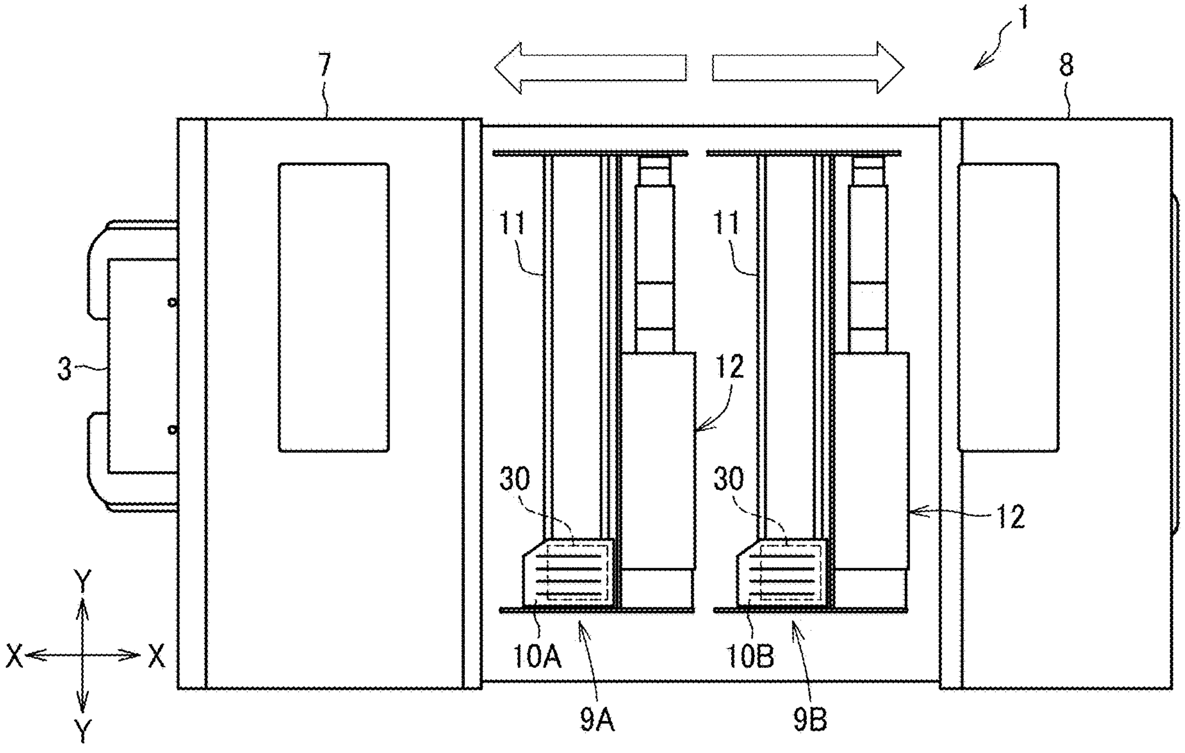
FIG. 4 is a plan view of the liquid discharge apparatus illustrated in FIG. 3.

FIG. 1 is a perspective view of a liquid discharge apparatus 1 according to an embodiment of the present disclosure, with covers closed, and FIG. 2 is a plan view thereof. FIG. 3 is a perspective view of the liquid discharge apparatus 1 with the covers open, and FIG. 4 is a plan view thereof. X directions in FIG. 1 are a front-rear direction, a sub-scanning direction, and a recording medium conveyance direction of the liquid discharge apparatus 1. Y directions in FIG. 1 are a transverse direction and a main scanning direction of the liquid discharge apparatus 1. Z directions in FIG. 1 are a vertical direction. The X directions and the Y directions are parallel to a surface, onto which a liquid is discharged, of a recording medium (also referred to simply as a medium) on a stage 3, but may have some error. The X, Y, and Z directions are orthogonal to each other. In FIGS. 1 to 4, a ventilation channel formation component, which is described later, is omitted.

As illustrated in FIGS. 1 and 2, the liquid discharge apparatus 1 includes the stage 3 in front of a housing 2. The stage 3 is mounted on a guide rail 4. The guide rail 4 extends in the X directions. A control panel 5 is disposed on a front face of the housing 2. An ink cartridge 6 is detachably attached to a side face of the housing 2. A front cover 7 and a rear cover 8 as an opening-and-closing cover (or simply as a cover) are disposed over the housing 2.

The stage 3 has a flat upper face on which the recording medium is placed. The upper face of the stage 3 is parallel to the X directions and the Y directions. The stage 3 moves on the guide rail 4 to reciprocate in both the X directions. The stage 3 is movable up and down in the Z directions. Thus, the height of the recording medium placed on the stage 3 is adjustable.

The front cover 7 and the rear cover 8 are movable in both the X directions. In FIG. 1, the front cover 7 has been moved backward and the rear cover 8 has been moved forward to 5 close the front cover 7 and the rear cover 8 (i.e., a closed position). On the other hand, in FIG. 3, the front cover 7 is moved forward and the rear cover 8 is moved backward to open the front cover 7 and the rear cover 8 (i.e., an open position). As described above, the front cover 7 and the rear cover 8 are slidably opened and closed, thereby reducing an occupied space of the liquid discharge apparatus 1 including an opening and closing space of each of the front cover 7 and the rear cover 8 as compared with a configuration in which a front cover and a rear cover are opened and closed in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 3 and 4, an apparatus body 50 of the liquid discharge apparatus 1 includes, for example, the housing 2 and liquid discharge units 9A and 9B mounted on the housing 2. In the present embodiment, specifically, the apparatus body 50 is a portion of the liquid discharge apparatus 1 other than the front cover 7 and the rear cover 8. The front cover 7 and the rear cover 8 are slidable in the X directions relative to the apparatus body 50.

The front cover 7 and the rear cover 8 are opened to expose the liquid discharge units 9A and 9B to the outside of the liquid discharge apparatus 1. When the liquid discharge units 9A and 9B are exposed to the outside, an operator can clean a maintenance unit 30, a liquid discharge head 20 (see FIG. 5), and the surrounding thereof, or can replace carriages 10A and 10B. The front cover 7 and the rear cover 8 are closed during image formation. As a result, the liquid discharge units 9A and 9B are covered by the front cover 7 and the rear cover 8 to block access to operation units such as the carriages 10A and 10B of the liquid discharge units 9A and 9B from the outside. The liquid discharge units 9A and 9B are disposed in the closed space in the front cover 7 or the rear cover 8. Accordingly, mist of ink (an example of a liquid) is prevented from scattering to environs outside the liquid discharge apparatus 1 while the liquid discharge head 20 discharges the ink to the recording medium (i.e., during liquid discharge operation). Further, the liquid discharge units 9A and 9B may include a fan to circulate an airflow in the front cover 7 or the rear cover 8, thereby collecting the generated mist of the ink (i.e., ink mist) in the front cover 7 or the rear cover 8.

The liquid discharge apparatus 1 according to the present embodiment includes the two liquid discharge units 9A and 9B arranged side by side in the X directions. The liquid discharge unit 9A discharges color ink and white ink. The liquid discharge unit 9B discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the recording medium is a cloth, the pretreatment liquid is preferably applied to the recording median before the image formation using the ink. In other words, one of the liquid discharge units 9A and 9B preferably discharges the pretreatment liquid.

Since the liquid discharge units 9A and 9B have similar configurations, the liquid discharge unit 9A is described below. The liquid discharge unit 9A includes the carriage 10A, a guide rod 11, an electrical component unit 12, and the maintenance unit 30. The liquid discharge units 9A and 9B and the carriages 10A and 10B are also referred to simply as a liquid discharge unit 9 and a carriage 10, respectively, unless distinguished.

The guide rod 11 extends in the main scanning direction. The carriage 10 is movable in the main scanning direction along the guide rod 11. The carriage 10 includes multiple liquid discharge heads 20 (see FIG. 6). The maintenance unit 30 is disposed at a position facing the guide rod 11 outside a liquid discharge region on one side in the transverse direction (Y directions).

The electrical component unit 12 includes, for example, a board and an electrical component cover covering the board. The electrical component unit 12 includes a control unit that controls the liquid discharge operation.

The maintenance unit 30 includes, for example, a wiping member that cleans a nozzle face of the liquid discharge head 20 and a suction mechanism that sucks the nozzle face. The wiping member may be a wiper made of, for example, rubber, or a web made of, for example, nonwoven fabric.

A process of forming an image on the recording medium by the liquid discharge head 20 is described below.

The recording medium is placed on the stage 3 and conveyed along the guide rail 4. The recording medium is conveyed to a rear side of the liquid discharge apparatus 1 by the stage 3 and the guide rail 4 as a conveyor, and the pretreatment liquid is applied to the recording median by the liquid discharge unit 9B. Specifically, while the carriage 10B moves in the main scanning direction along the guide rod 11, the liquid discharge unit 9B discharges the pretreatment liquid from nozzles of the liquid discharge head 20 to apply the pretreatment liquid to the entire width of the recording medium in the main scanning direction. The application of the pretreatment liquid is repeated at multiple positions in the sub-scanning direction, thereby applying the pretreatment liquid to the entire recording medium. After that, the stage 3 moves forward, and the liquid discharge unit 9A discharges the color ink of multiple colors onto the recording medium by a similar method by the liquid discharge unit 9B. When white color is printed on the recording medium, for example, the liquid discharge unit 9A discharges the white ink onto the recording medium, the stage 3 moves to the rear side of the liquid discharge unit 9A again, and the liquid discharge unit 9A discharges the color ink onto the recording medium. Thus, an image is formed on the recording medium.

Figure 5:
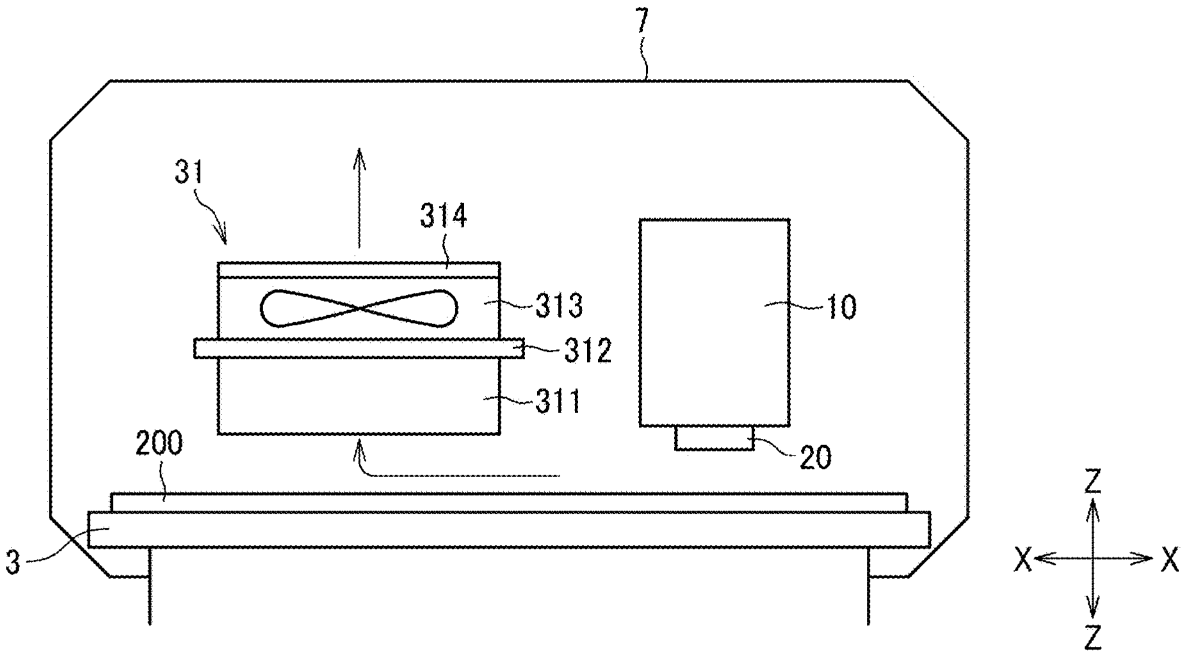
FIG. 5 is a side view of the liquid discharge apparatus of FIG. 1, illustrating an airflow inside a front cover.

Each of the liquid discharge units 9A and 9B is provided with an airflow generator 31 that circulates the ink mist in a closed space in each of the front cover 7 and the rear cover 8 that has been closed. The airflow generator 31 is described below with reference to FIGS. 5 and 6. As illustrated in FIG. 5, the airflow generator 31 is disposed inside the front cover 7 that has been closed. The airflow generator 31 includes an intake duct 311, a filter 312, a fan 313, and an exhaust duct 314.

Figure 6:
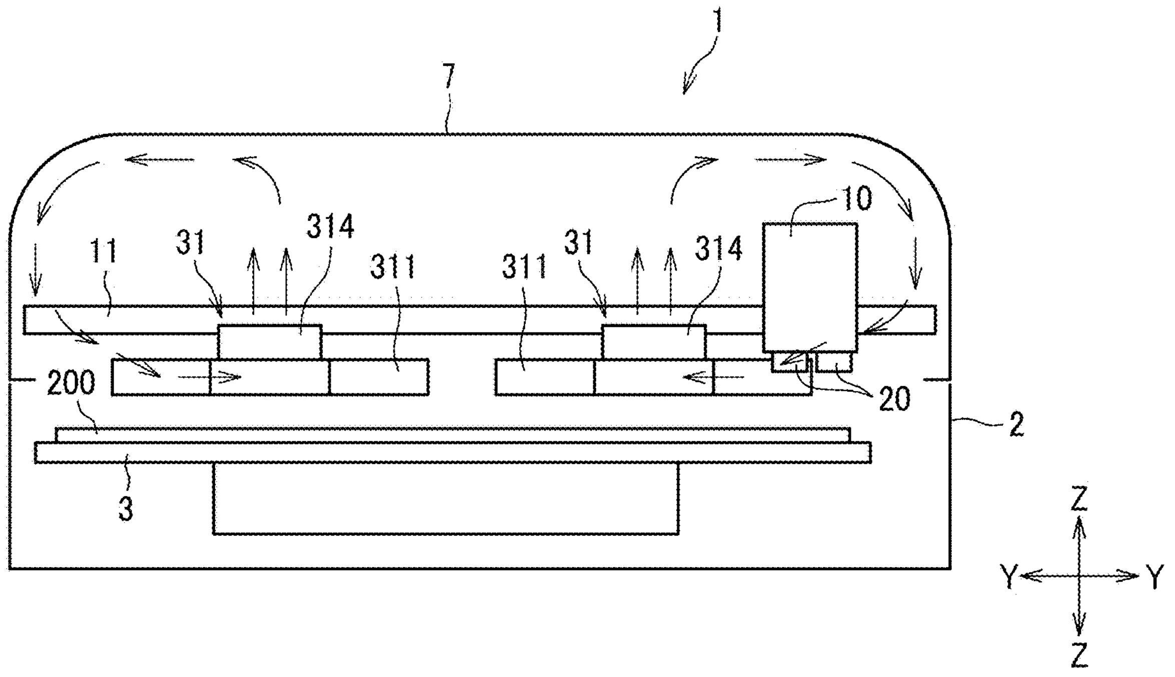
FIG. 6 is a front view of the liquid discharge apparatus illustrated in FIG. 5, illustrating the airflow inside the front cover.

As indicated by arrows in FIG. 5, the fan 313 generates an airflow flowing from a movement region of the carriage 10 (i.e., an area around the guide rod 11) toward the intake duct 311. This airflow is exhausted upward from the exhaust duct 314 through the filter 312. As illustrated in FIG. 6, two airflow generators 31 are disposed in the transverse direction of the liquid discharge apparatus 1. The airflow exhausted from the exhaust duct 314 flows toward the intake duct 311 again along an inner face of the front cover 7. As a result, the airflow is circulated in the front cover 7.

As described above, the movement region of the carriage 10 can be arranged in the circulated airflow. As a result, the ink mist generated from the liquid discharge head 20 of the carriage 10 can be circulated and collected in each of the front cover 7 and the rear cover 8. When ink is discharged from the liquid discharge head 20 of the carriage 10 to a recording medium 200 on the stage 3, the ink mist is generated around the liquid discharge head 20. The ink mist flows toward the intake duct 311 by the airflow formed by the fan 313. Accordingly, the ink mist is prevented from adhering to the surrounding of the liquid discharge head 20. At this time, the higher airtightness of the closed space in the front cover 7 can enhance a circulation property of the ink mist in the front cover 7 and a collection property of the ink mist by the filter 312.

The board, for example, of the electrical component unit 12 generates heat when energized, thereby increasing the temperature inside the apparatus body 50. For this reason, the airflow is fed from the outside of the liquid discharge apparatus 1 through a ventilation channel to cool the electrical component unit 12. The ventilation channel is a path extending from the outside of the liquid discharge apparatus 1 to the electrical component unit 12. As described above, in the liquid discharge apparatus 1 according to the present embodiment, each of the front cover 7 and the rear cover 8 slides to be opened and closed. Accordingly, the ventilation channel is required to be disposed at a position which does not interfere with each of the front cover 7 and the rear cover 8. In addition, the liquid discharge apparatus 1 is required to achieve the airtightness in each of front cover 7 and the rear cover 8 when the front cover 7 or the rear cover 8 is closed so as to circulate and collect the ink mist in each of the front cover 7 and the rear cover 8 as described above.

For this reason, in order to prevent the interference between a component for defining the ventilation channel and each of the front cover 7 and the rear cover 8, it is difficult to form a large opening in each of the front cover 7 and the rear cover 8 while achieving the airtightness. As described above, it is difficult to form the ventilation channel extending from the outside of the liquid discharge apparatus 1 to the electrical component unit 12 while avoiding the front cover 7 and the rear cover 8.

Figure 7:
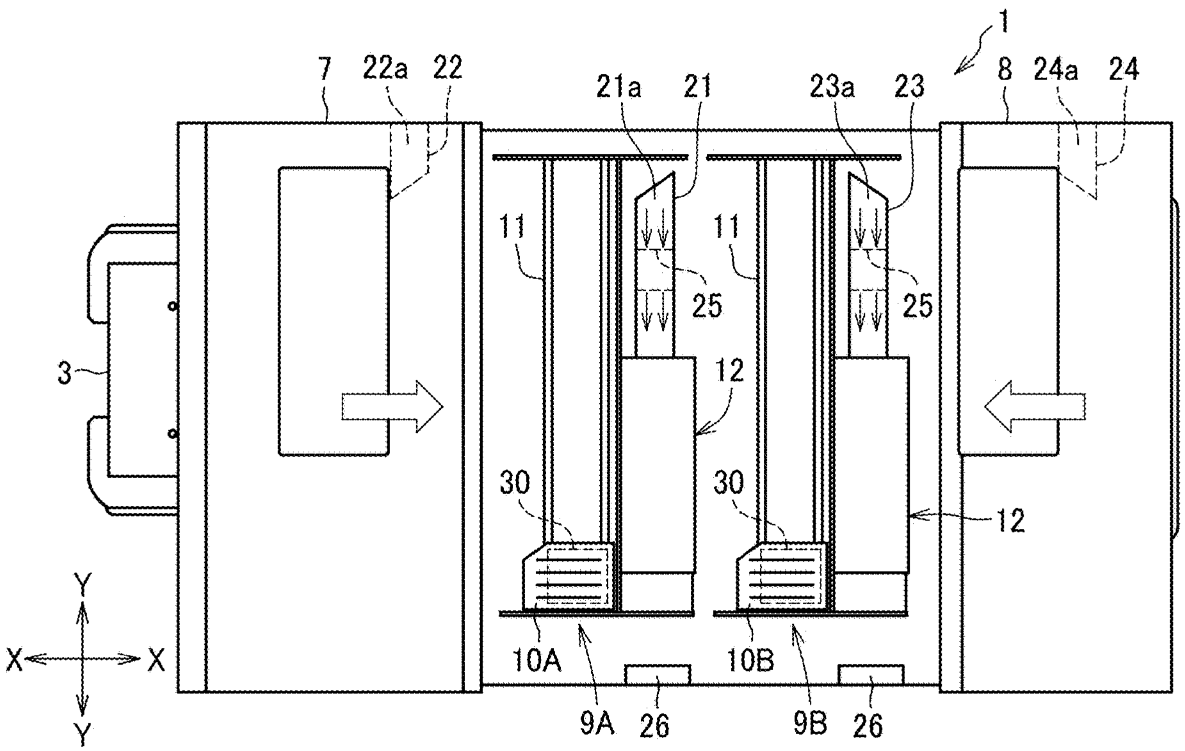
FIG. 7 is a plan view of the liquid discharge apparatus of FIG. 1, illustrating intake channel formation components with the covers open.

A description is given below of the configuration of the liquid discharge apparatus 1 according to the present embodiment, which includes the ventilation channel connecting the outside and the electrical component unit 12, with reference to FIGS. 7 and 8. FIG. 7 is a plan view of the liquid discharge apparatus 1 with the front cover 7 and the rear cover 8 open, and FIG. 8 is a plan view of the liquid discharge apparatus 1 with the front cover 7 and the rear cover 8 closed.

As illustrated in FIG. 7, the electrical component unit 12 of the liquid discharge unit 9A includes a first intake channel formation component 21 as a first ventilation channel formation component on one end of the apparatus body 50 in the Y directions. The first intake channel formation component 21 is a tubular component that defines a first intake channel 21*a* as a first ventilation channel therein and extends in the Y directions. One end of the first intake channel formation component 21 is an open end (i.e., a first end), and the other end communicates with a space inside the electrical component cover in which the board is disposed (i.e., an interior of the apparatus body 50). A second intake channel formation component 22 as a second ventilation channel formation component is disposed on a side face of the front cover 7 on the left side as viewed from the front side of the liquid discharge apparatus 1 (i.e., the upper side in FIG. 7). The second intake channel formation component 22 is a tubular component that defines a second intake channel 22*a* as a second ventilation channel therein and extends in the Y directions. One end of the second intake channel formation component 22 is an open end disposed on the side face of the front cover 7 on the left side as viewed from the front side of the liquid discharge apparatus 1 (i.e., the upper side in FIG. 7). The one end is open to the outside of the front cover 7 of the liquid discharge apparatus 1, and the other end (i.e., a second end) is open to the inside of the front cover 7.

An intake fan 25 is disposed inside the first intake channel formation component 21. The intake fan 25 forms an airflow in the direction indicated by arrows illustrated in FIG. 7. A louver 26 is disposed at a position downstream from the intake fan 25 and the electrical component unit 12 in the direction of the airflow to ventilate between the inside and the outside of the liquid discharge apparatus 1 at the position. Alternatively, the intake fan 25 may be disposed inside the second intake channel formation component 22.

Figure 8:
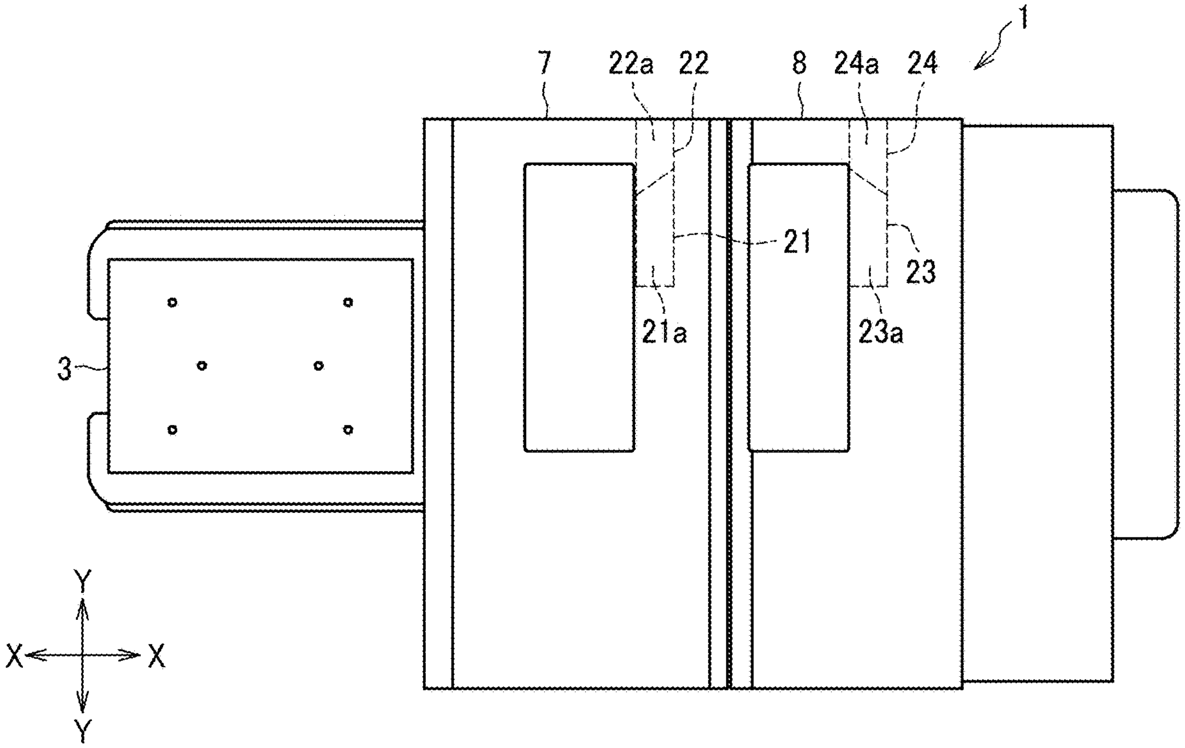
FIG. 8 is a plan view of the liquid discharge apparatus illustrated in FIG. 7, illustrating the intake channel formation components with the covers closed.

As illustrated in FIG. 8, when the front cover 7 is at a closed position, the first intake channel formation component 21 and the second intake channel formation component 22 face each other to be connected to each other. Thus, the first intake channel 21*a* and the second intake channel 22*a* communicate with each other, and an intake channel as a ventilation channel extending from the outside of the liquid discharge apparatus 1 to the inside of the electrical component unit 12 is formed to ventilate the interior of the apparatus body 50. Ends to be connected to each other of the first intake channel formation component 21 and the second intake channel formation component 22 may be elastic. When the first intake channel formation component 21 and the second intake channel formation component 22 are connected to each other, an airflow from the outside of the liquid discharge apparatus 1 to the inside of the electrical component unit 12 via the first intake channel 21*a* and the second intake channel 22*a* is formed by the intake fan 25. Thus, the inside of the electrical component unit 12 can be cooled. The first intake channel formation component 21 and the second intake channel formation component 22 are formed so as to partially overlap each other in the Y directions. Such a configuration prevents a gap due to a component tolerance from being formed between the first intake channel 21*a* and the second intake channel 22*a*.

Accordingly, the first intake channel 21a and the second intake channel 22a reliably communicate with each other.

As illustrated in FIGS. 7 and 8, the electrical component unit 12 of the liquid discharge unit 9B includes a first intake channel formation component 23 as the first ventilation channel formation component. The first intake channel formation component 23 defines a first intake channel 23a as the first ventilation channel therein. The intake fan 25 is disposed inside the first intake channel formation component 23. A second intake channel formation component 24 as the second ventilation channel formation component is disposed on a side face of the rear cover 8 on the left side as viewed from the front side of the liquid discharge apparatus 1 (i.e., the upper side in FIG. 7). The second intake channel formation component 24 defines a second intake channel 24a as the second ventilation channel therein.

The first intake channel formation component 23 and the second intake channel formation component 24 have the same configurations as those of the first intake channel formation component 21 and the second intake channel formation component 22 except that the first intake channel formation component 23 and the second intake channel formation component 24 are provided for the liquid discharge unit 9B or the rear cover 8.

As described above, in the present embodiment, the cover (i.e., the front cover 7 or the rear cover 8) and the apparatus body of the liquid discharge apparatus respectively include the intake channel formation components defining the intake channels. When the cover is closed, the intake channel formation components are connected to each other to form one continuous intake channel. Due to such a configuration, each of the intake channel formation components does not interfere with other components in the liquid discharge apparatus when the cover is opened and closed, and the intake channel extending from the outside of the liquid discharge apparatus to the electrical component unit can be formed when the cover is closed. Specifically, the front cover 7 includes the second intake channel formation component 22 defining the second intake channel 22a that communicates with the outside of the liquid discharge apparatus 1. The second intake channel 22a allows the first intake channel formation component 21 of the apparatus body 50 not to extend to an end of the liquid discharge apparatus 1 in the transverse direction (i.e., the upper end in FIG. 7). Accordingly, the first intake channel formation component 21 is prevented from interfering with a side face of the front cover 7. The second intake channel formation component 22, which is disposed only at an end of the front cover 7 in the transverse direction, does not interfere with other components of the apparatus body 50 such as the carriage 10A. Accordingly, a large opening is unnecessary in the cover (i.e., the front cover 7 or the rear cover 8) to avoid interference between the intake channel formation component and the cover, thereby enhancing the airtightness in the cover when the cover is closed. In the present embodiment, the enhanced airtightness inside the cover is not limited to a state in which the closed space inside the cover is separated from the outside of the liquid discharge apparatus without a gap. The term "enhancing the airtightness inside the cover" means that an opening area to the outside in the cover becomes smaller.

In particular, in the present embodiment, the first intake channel formation component 21 and the second intake channel formation component 22 have slanted ends corresponding to each other. Specifically, an end (i.e., a first end) of the first intake channel formation component 21 connected to the second intake channel formation component 22 is the slanted end that is long on the right side in FIG. 7 and short on the left side in FIG. 7. On the other hand, an end (i.e., a second end) of the second intake channel formation component 22 connected to the first intake channel formation component 21 is the slanted end that is long on the left side in FIG. 7 and short on the right side in FIG. 7. In other words, the first end of the first intake channel 21a is slanted in a first direction, the second end of the second intake channel 22a is slanted in a second direction different from the first direction, and the first end matches the second end at the closed position of the front cover 7. With such a configuration, when the front cover 7 is closed, the first intake channel formation component 21 and the second intake channel formation component 22 are reliably connected to each other. In other words, the first intake channel 21a communicates with the second intake channel 22a without a gap.

In the above-described embodiment, the connected ends of the first intake channel formation component 21 and the second intake channel formation component 22 are slanted, but may be flat ends. For example, in this case, the first intake channel formation component 21 and the second intake channel formation component 22 may have a length so as to overlap each other in the Y directions, and at least one of the connected ends of the first intake channel formation component 21 or the second intake channel formation component 22 may be elastic.

With this configuration, when the front cover 7 is closed, the first intake channel formation component 21 and the second intake channel formation component 22 are smoothly connected to each other by the elastically deformed connected end. In other words, the first intake channel 21a reliably communicates with the second intake channel 22a.

In the above-described embodiment, the intake channel that takes in air from the outside of the liquid discharge apparatus to the inside of the electrical component unit is described as an example of the ventilation channel, but the ventilation channel may be an exhaust channel that exhausts air to the outside of the liquid discharge apparatus. Further, both the intake channel and the exhaust channel may be provided in another embodiment. In the present embodiment, the ventilation channel is used to form an airflow into, but not limited to, the electrical component unit.

Figure 9:
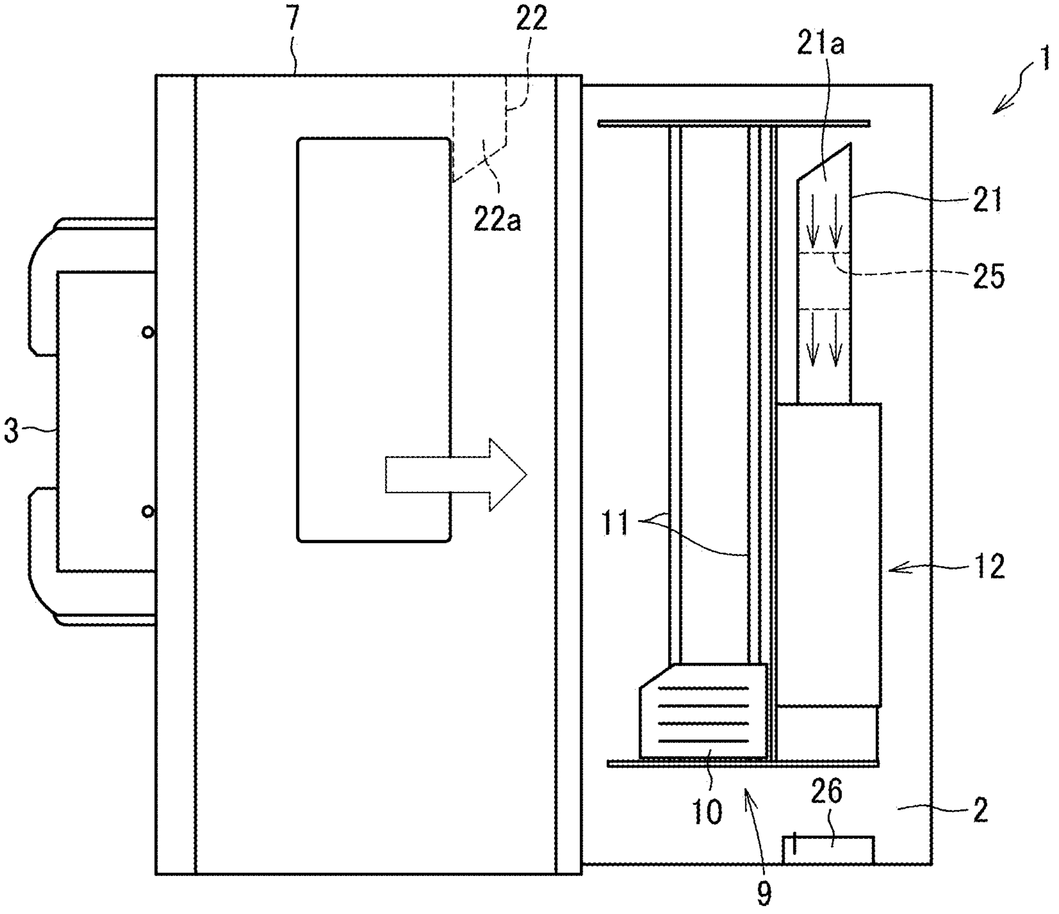
FIG. 9 is a plan view of a liquid discharge apparatus including one liquid discharge unit, according to an embodiment of the present disclosure.
Figure 10:
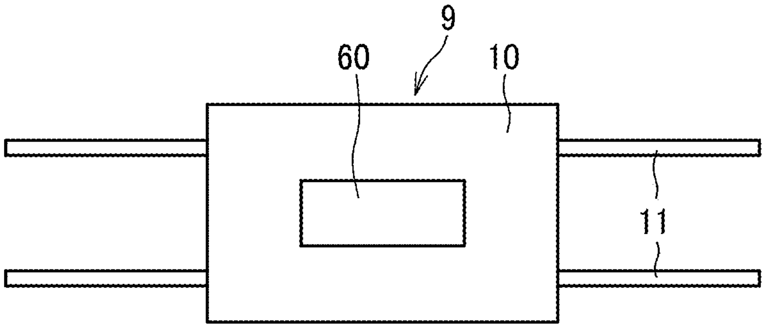
FIG. 10 is a plan view of a liquid discharge unit including one liquid discharge head unit mounted on one carriage, according to an embodiment of the present disclosure.

In the above description, the liquid discharge apparatus 1 includes the multiple (two) liquid discharge units 9A and 9B, and each of the liquid discharge units 9A and 9B includes the corresponding carriage 10A or 10B including the liquid discharge head 20 and the guide rod 11, but embodiments of the present disclosure are not limited thereto. For example, as illustrated in FIG. 9, the liquid discharge apparatus 1 may include only one liquid discharge unit 9. As illustrated in FIG. 10, in the liquid discharge apparatus 1, the liquid discharge unit 9 includes the guide rod 11, the carriage 10, and a liquid discharge head unit 60 mounted on the carriage 10. The liquid discharge head unit 60 includes the multiple liquid discharge heads 20 but may include the single liquid discharge head 20. The liquid discharge head unit 60 discharges the pretreatment liquid, the white ink, or the color ink. The liquid discharge apparatus 1 may include three or more liquid discharge units 9.

Figure 11:
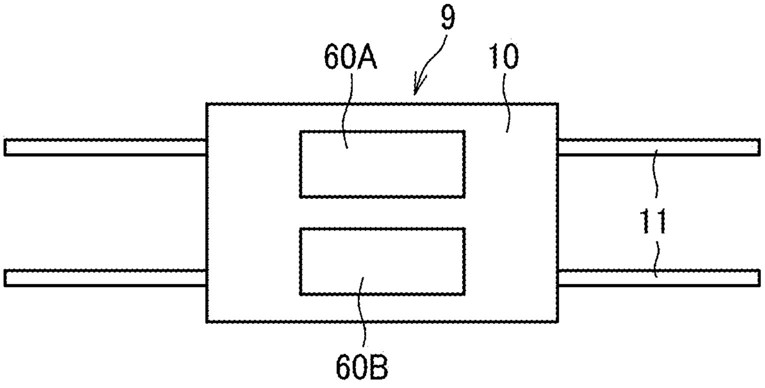
FIG. 11 is a plan view of a liquid discharge unit including two liquid discharge head units mounted on one carriage, according to an embodiment of the present disclosure.
Figure 12:
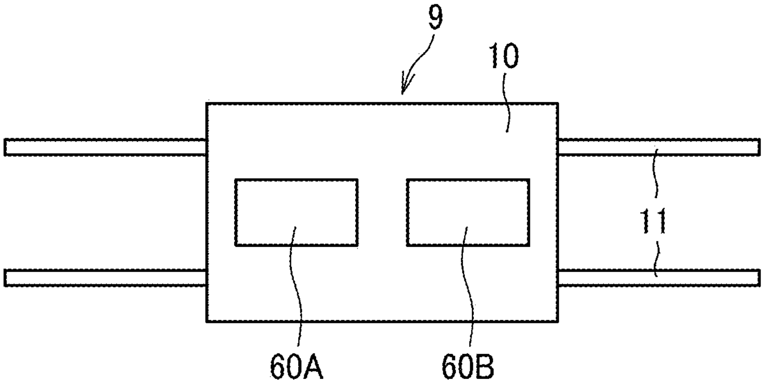
FIG. 12 is a plan view of a liquid discharge unit including two liquid discharge head units mounted on one carriage in a different arrangement from FIG. 11, according to an embodiment of the present disclosure.

As illustrated in FIG. 11, the carriage 10 may include multiple liquid discharge head units 60A and 60B. In this case, for example, the white or color ink is discharged by the liquid discharge head unit 60A, and the pretreatment liquid is discharged by the liquid discharge head unit 60B. The liquid discharge head units 60A and 60B may be arranged side by side in the sub-scanning direction as illustrated in FIG. 11, or in a row in the main scanning direction as illustrated in FIG. 12. In each of such liquid discharge apparatuses, similarly to the above-described embodiment, as illustrated in FIG. 9, the apparatus body and the cover as the opening-and-closing cover respectively include the ventilation channel formation components, and the ventilation channel formation components are connected to each other when the cover is closed.

The above-described embodiments are illustrative and do not limit the present disclosure. Numerous additional modifications and variations are possible in light of the above teachings. It is therefore to be understood that within the scope of the appended claims.

In the present disclosure, the liquid to be discharged is not limited to a particular liquid as long as the liquid has a viscosity or surface tension to be discharged from a head (liquid discharge head). However, preferably, the viscosity of the liquid is not greater than 30 mPa·s under ordinary temperature and ordinary pressure or by heating or cooling. Examples of the liquid to be discharged include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "liquid" includes not only ink but also paint, a pretreatment liquid, a binder, and an overcoat liquid.

In the present disclosure, the term "liquid discharge apparatus" includes a carriage including a liquid discharge head and drives the liquid discharge head to discharge liquid. The term "liquid discharge apparatus" used in the present disclosure includes, in addition to apparatuses to discharge liquid to a recording medium serving as materials onto which liquid can adhere, apparatuses to discharge the liquid into gas (air) or liquid.

For example, the "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, fix reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

Aspect 1

A liquid discharge apparatus includes an apparatus body including a liquid discharge unit, and an opening-and-closing cover. The apparatus body includes a first ventilation channel formation component defining a first ventilation channel. The opening-and-closing cover includes a second ventilation channel formation component defining a second ventilation channel. The first ventilation channel and the second ventilation channel communicate with each other when the opening-and-closing cover is disposed at a position to cover the liquid discharge unit.

In other words, a liquid discharge apparatus includes an apparatus body, a liquid discharge unit, a first ventilation channel, a cover, and a second ventilation channel. The liquid discharge unit discharges a liquid. The first ventilation channel in the apparatus body has a first end opened to an interior of the apparatus body in a first direction. The cover is movable between an open position and a closed position to openably close the apparatus body. The second ventilation channel connected to the cover has a second end opened to the interior of the apparatus body in a second direction different from the first direction. The cover at the closed position causes the first end of the first ventilation channel to be connected to the second end of the second ventilation channel.

Aspect 2

In the liquid discharge apparatus according to Aspect 1, the first ventilation channel formation component and the second ventilation channel formation component have inclined planes facing each other. The inclined planes have shapes corresponding to each other.

In other words, in the liquid discharge apparatus according to Aspect 1, the first end of the first ventilation channel is slanted in a first direction, and the second end of the second ventilation channel is slanted in a second direction different from the first direction. The first end matches the second end at the closed position of the cover.

Aspect 3

In the liquid discharge apparatus according to Aspect 1 or 2, at least one of the first ventilation channel formation component or the second ventilation channel formation component has a portion, which is formed of an elastic material, to communicate with the other of the first ventilation channel formation component and the second ventilation channel formation component.

In other words, in the liquid discharge apparatus according to Aspect 1 or 2, at least one of the first end of the first ventilation channel or the second end of the second ventilation channel is elastic.

Aspect 4

The liquid discharge apparatus according to any one of Aspects 1 to 3 further includes a conveyor and an electrical component unit. The conveyor conveys a medium to the liquid discharge unit in a conveyance direction. The electrical component unit is disposed adjacent to the liquid discharge unit in the conveyance direction. The first ventilation channel is connected to the electrical component unit and extends in a transverse direction orthogonal to the conveyance direction. The second ventilation channel extends in the transverse direction to be connected to the first ventilation channel at the closed position of the cover to form a ventilation channel connecting the electrical component unit and the cover.

Aspect 5

In the liquid discharge apparatus according to Aspect 4, the first ventilation channel includes a fan to generate an airflow flowing through the first ventilation channel in the transverse direction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

an apparatus body;

a liquid discharge unit in the apparatus body to discharge a liquid;

a first ventilation channel in the apparatus body, the first ventilation channel having a first end opened to an interior of the apparatus body in a first direction;

a cover movable between an open position and a closed position to openably close the apparatus body; and a second ventilation channel connected to the cover, the second ventilation channel having a second end opened to the interior of the apparatus body in a second direction different from the first direction, wherein the cover at the closed position causes the first end of the first ventilation channel to be connected to the second end of the second ventilation channel, the first ventilation channel extends lengthwise in the first direction, the first end of the first ventilation channel is slanted such that one side of the first end of the first ventilation channel is closer to an exterior of the apparatus body than another side of the first end of the first ventilation channel in the first direction, the second ventilation channel extends lengthwise in the second direction, and the second end of the second ventilation channel is slanted such that one side of the second end of the second ventilation channel is closer to the exterior of the apparatus body than another side of the second end of the second ventilation channel in the second direction.

2. The liquid discharge apparatus according to claim 1, wherein the first end matches the second end at the closed position of the cover.

3. The liquid discharge apparatus according to claim 1, wherein at least one of the first end of the first ventilation channel or the second end of the second ventilation channel is elastic.

4. The liquid discharge apparatus according to claim 1, further comprising:

a conveyor to convey a medium to the liquid discharge unit in a conveyance direction; and an electrical component unit adjacent to the liquid discharge unit in the conveyance direction, wherein the first ventilation channel is connected to the electrical component unit and extends in a transverse direction orthogonal to the conveyance direction, and the second ventilation channel extends in the transverse direction to be connected to the first ventilation channel at the closed position of the cover to form a ventilation channel connecting the electrical component unit and the cover.

5. The liquid discharge apparatus according to claim 4, wherein the first ventilation channel includes a fan to generate an airflow flowing through the first ventilation channel in the transverse direction.

6. The liquid discharge apparatus according to claim 1, wherein:

the cover is slidably movable between the open position and the closed position, and in the closed position, the cover is configured to collect ink mist generated by the liquid discharge unit.

* * * * *